Patented Nov. 5, 1940

2,220,667

UNITED STATES PATENT OFFICE 2,220,667

COLLOIDAL GEL

Pierce M. Travis, Ridgewood, N. J., assignor to Jacques Wolf & Company, Passaic, N. J., a corporation of New Jersey No Drawing. Application September 7, 1938, Serial No. 228,799

10 Claims. (Cl. 127—46)

This invention relates to colloidal gels and more particularly to colloidal gels of the type suitable for precipitating other colloids from solution. The gel of the present invention is electro-positive in character, and, although it may be used to precipitate a wide variety of negatively charged colloids, it is particularly well suited to facilitate the removal of color solids or other colloidal or suspended matter from sugar solutions, syrups, and the like.

One of the principal problems in the refining of sugar is the removal of various colloidal materials present in cane juice and other sugar solutions which discolor the solutions and render them turbid. It is essential that these colloids be removed prior to crystallization of the sucrose and a number of different methods have been used in the past to accomplish this result. In the process known as "defecation," lime, or a mixture of lime and calcium acid phosphate is added to the hot sugar solution to cause flocculation of the colloids, the floc being separated from the liquor by sedimentation and filtration. This process is not completely satisfactory because the character of the precipitate is such that it tends to clog the filter presses now commonly used in the industry. The color is usually removed by passing the sugar solution through char filters, the colloidal color particles being adsorbed on the surface of the char, but the cost of decoloring sugar solutions by this process is relatively high because of the necessity for re-activating the char at frequent intervals and for replacing spent char from time to time.

The present invention provides a novel means for efficiently and inexpensively removing colloidal material from sugar solutions. The colloidal particles present in sugar solutions bear a negative charge, and their removal is greatly facilitated by the neutralization of this charge. I have found that it is possible to prepare a composite colloidal gel having a high adsorptive affinity for the ions of certain metallic elements, and that when a small quantity of this gel is added to a raw sugar solution the negative charges of the colloidal particles are neutralized and flocculation and precipitation take place to give a clear pale straw-colored supernatant liquor. Furthermore, the character of the floc is such that it may be easily separated from the liquor by filtration methods now in common use in the industry.

Two general methods are available for obtaining gels or substances in a colloidal state: the dispersion or peptization method and the condensation or precipitation method. In the dispersion method the substance in mass is disintegrated by physical means. An example of the dispersion method of forming a colloid might be the grinding of a pigment or other dry color with a suitable oily medium to form a paint. Condensation or precipitation methods are more diverse and more complex. The precipitation of a solid substance from a liquid medium may be considered as taking place in two stages: a first stage in which crystal nuclei, minute particles of approximately molecular dimensions, are formed, and a second stage in which these nuclei grow to such a size that the gravitational forces acting on the particles exceed the forces tending to keep the particles suspended in the liquid medium. The formation of a colloidal gel is essentially a matter of arresting the growth of these particles while they are still of submicroscopic dimensions. At low concentrations the ratio of the rate at which nuclei are formed to the rate at which the nuclei grow is relatively small, and hence colloid formation is less likely to occur in dilute solution. At high concentrations, on the other hand, the rate of formation of nuclei is very high, in fact so high that in some cases minute particles form a network within the liquid and the mixture gels.

It is generally believed that the particles of a colloid carry an electrical charge either positive or negative and this hypothesis is borne out by the fact that many colloids can be "broken" or precipitated by the addition of a small quantity of an electrolyte. In certain cases, however, the colloidal particles appear to have a specific adsorptive affinity for the ions of the electrolyte, and in such a case the structure of the colloid is substantially unchanged by the presence of an electrolyte. This characteristic of colloidal solutions is made use of in the present invention to produce a gel which is a markedly superior precipitant.

The following procedure illustrates one method which I have found satisfactory in preparing the colloidal gel of the present invention. I have obtained best results by using an insoluble phosphate as the basis of the gel, and I have found that it is desirable to use trisodium phosphate as a starting material. A solution is made up by dissolving 34 grams of the dodecahydrate of trisodium phosphate in 400 cc. of water. While the solution is being stirred or otherwise agitated, 4 grams of 30 per cent sodium silicate solution and a solution of 7.25 grams of aluminum sulphate in 50 cc. of water are added. The aluminum sulphate used is the type which crystallizes with 18 molecules of water. To this solution is added 100 cc. of a solution containing 50 grams of calcium chloride dihydrate, the mixture being stirred rapidly during the addition of the calcium chloride. A thick colloidal gel is formed almost immediately, and thereafter stirring is continued at intervals and with extreme caution to avoid breaking down the gel structure. The gel is allowed to stand for a period of preferably not less than 30 minutes at a temperature of 15° C. to 23° C. It will be apparent to those skilled in the art that the quantity of calcium chloride added is considerably in excess of that stoichiometrically required, and hence there is a substantial excess of calcium ions present in the solution. The purpose of the 30 minute period is to allow ample time for adsorption of excess calcium ions and aluminum ions on the particles of the colloid. Both the rate of adsorption and the total amount of adsorption are increased by this excess of calcium ions in the solution.

The gel is washed with water until it is substantially free from soluble materials (mostly sodium and calcium chloride) as shown by the well known silver nitrate test.

The quantity of the gel which is added to a sugar solution depends upon the purity of the sugar solution to which it is added. In the case of a raw sugar solution I have found that good results are obtained by adding 1 to 1½ per cent of the gel, that is, a quantity of the gel such that the ratio of gel solids to sugar solids is from .01 to .015. For best results the gel should be allowed to contact the sugar solution for about 25 minutes at a temperature of about 90° C. It is desirable that the pH of the solution be in the neighborhood of 7.3. Under these conditions an excellent floc is obtained, the turbidity of the solution is completely removed, and the solution is decolored to a pale straw color. In the case of the so-called "washed sugars" only 1/10 of 1 per cent of the gel on a dry basis need be added to give almost complete removal of the colloids. At the end of 25 minutes the cleared solution is filtered.

It is to be understood that the procedure set forth above is illustrative only and that numerous changes might be made without departing from the essential spirit of the invention. Soda alum, aluminum chloride, or other aluminum salt may be substituted for the aluminum sulphate. When aluminum chloride is used the normal acidity of the salt must be neutralized, by the addition of an alkali, preferably caustic soda. It is sometimes advantageous to use aluminum chloride in place of an aluminum sulphate because of the fact that sodium chloride is more soluble than calcium sulphate, and hence may be removed from the gel more easily by washing. Other soluble calcium salts may be substituted for the chloride. The sodium silicate is added to stabilize the colloid. It is probable that the sodium silicate acts as a protective colloid and that other types of protective colloids might be substituted for the silicate. Similarly changes might be made in the various operating conditions, such as temperature and time of contact for ionic adsorption, and in the concentrations of the various constituents, all without departing from the essential nature of the invention.

I believe that the effectiveness of my gel is in large measure due to the relatively high adsorption of positive ions on the colloidal particles of the gel. It is a well known fact that trivalent ions are much more effective in discharging colloidal particles than are bivalent ions. The effectiveness of the trivalent ions carrying a triple charge is not, as might be expected, one and one-half times that of the bivalent ions which carry a double charge, but is in the neighborhood of fifty times as great. Hence the gel of the present invention which contains the trivalent aluminum ions as well as bivalent ions is markedly superior to a gel containing only bivalent ions. Furthermore, my experimental work indicates that colloidal particles which are saturated with respect to ions of one kind are not necessarily saturated with respect to ions of another kind. Hence, there is a distinct advantage in using solutions containing more than one type of adsorbable ions.

From the above description it is apparent that the present invention provides a novel and efficient means for precipitating negatively charged colloids. The negative charges of the particles of the colloid are neutralized by positive ions or cations adsorbed on the colloidal particles of a gel. The gel of the present invention is particularly well suited to precipitating the colloids present in a sugar solution, and when added to such a solution causes agglomeration of the colloidal particles to form a floc which rapidly precipitates and separates from the solution.

I claim:

1. Method of making a colloidal gel which comprises reacting a concentrated solution of a phosphate with a quantity of calcium salt substantially in excess of that required to precipitate the phosphate, said reaction being carried out in the presence of small quantities of a soluble aluminum salt and a soluble silicate.

2. Method of making a colloidal gel which comprises reacting a concentrated solution of a phosphate with a quantity of calcium salt substantially in excess of that required to precipitate the phosphate, said reaction being carried out in the presence of small quantities of a soluble aluminum salt and a soluble silicate and at a pH value between 6.7 and 7.5.

3. The method of making a colloidal gel which comprises mixing with 400 parts of a .22 molal trisodium phosphate, 3 parts of 30 per cent sodium silicate and 50 parts of .22 molal aluminum sulphate, rapidly stirring into the mixture 100 parts of 3.4 molal calcium chloride to form a thick gel, allowing the gel to stand for approximately thirty minutes at room temperature, washing the gel to remove soluble materials.

4. A colloidal gel comprising the reaction product of concentrated solutions of a phosphate, a silicate, an aluminum salt, and a calcium salt.

5. A colloidal gel comprising the reaction product of concentrated solutions of sodium phosphate, a sodium silicate, calcium chloride, and an aluminum sulphate.

6. A composite gel comprising a colloidal dispersion of an intimate mixture of a calcium phosphate, a calcium silicate, and aluminum hydroxide.

7. A composite gel having approximately the following composition on a dry basis, calcium phosphate 70 to 90 per cent, calcium silicate 2 to 10 per cent, and aluminum hydroxide 2 to 12 per cent.

8. Method of purifying a solution of incompletely refined sugar which consists in adding to the said solution a small quantity of a colloidal gel comprising the reaction product of concentrated solutions of a phosphate, a silicate, an aluminum salt, and a calcium salt.

9. Method of purifying a solution of incompletely refined sugar which consists in adding to the said solution a small quantity of a colloidal gel comprising a colloidal dispersion of an intimate mixture of a calcium phosphate, a calcium silicate, and aluminum hydroxide.

10. Method of purifying a solution of incompletely refined sugar which consists in adding to the said solution a small quantity of a colloidal gel comprising a composite gel having approximately the following composition on a dry basis, calcium phosphate 70 to 90 per cent, calcium silicate 2 to 10 per cent, and aluminum hydroxide 2 to 12 per cent.

PIERCE M. TRAVIS.